(12) United States Patent
Hyodo et al.

(10) Patent No.: US 6,355,353 B1
(45) Date of Patent: Mar. 12, 2002

(54) GLASS SUBSTRATE HAVING TRANSPARENT CONDUCTIVE FILM

(75) Inventors: Masato Hyodo; Koichiro Kiyohara; Kiyotaka Ichiki, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/521,410

(22) Filed: Mar. 8, 2000

(30) Foreign Application Priority Data

Mar. 9, 1999 (JP) .......................... 11-062324

(51) Int. Cl.⁷ .................. B32B 15/00; B32B 17/00
(52) U.S. Cl. ................. 428/432; 428/699; 136/258; 136/252
(58) Field of Search ................ 428/432, 699; 136/258, 252; 257/432

(56) References Cited

U.S. PATENT DOCUMENTS

| | | | |
|---|---|---|---|
| 4,697,041 A | * | 9/1987 | Okiniwa et al. ........ 136/244 |
| 5,348,589 A | * | 9/1994 | Arai et al. ............ 136/244 |
| 5,631,065 A | | 5/1997 | Gordon |
| 5,776,594 A | | 7/1998 | Austin |

FOREIGN PATENT DOCUMENTS

| | | |
|---|---|---|
| EP | 0 866 037 A2 | 9/1998 |
| EP | 0 893 833 A2 | 1/1999 |
| GB | 2 252 332 A | 8/1992 |
| JP | WO 00/32391 | 6/2000 |

OTHER PUBLICATIONS 11302038 (Abstract).
European Search Report.

* cited by examiner

Primary Examiner—Deborah Jones
Assistant Examiner—Gwendolyn Blackwell-Rudasill
(74) Attorney, Agent, or Firm—Sughrue Mion, PLLC

(57) ABSTRACT

A glass substrate having a transparent conductive film of $SnO_2$ is disclosed, in which the transparent conductive film is prevented from developing hair cracks even when it has a thickness of 5,000 Å or larger. The glass substrate comprises an alkali-containing base glass plate 10 having a smooth surface and, formed thereon in this order, an undercoat 12 for imparting roughness which has a thickness of 150 Å or larger and is made of a crystalline metal oxide, a continuous alkali barrier film 14 made of $SiO_2$ and having such a small thickness as to reflect the surface roughness of the undercoat, and a transparent conductive film 16 made of $SnO_2$ doped with one or more appropriate impurities and having a thickness of 5,000 Å or larger. The transparent conductive film has an adhesion strength of 37 mN or higher as measured in accordance with "Adhesion Test for Thin Film Deposited on Glass Substrate" as provided for in JIS R3255-1997.

4 Claims, 2 Drawing Sheets

GLASS SUBSTRATE HAVING TRANSPARENT CONDUCTIVE FILM

FIELD OF THE INVENTION

The present invention relates to a glass substrate having a transparent conductive film for a functional element. More particularly, the invention relates to a glass substrate which comprises a base glass plate having a smooth surface, a continuous alkali barrier film, and a relatively thick, transparent, conductive film overlying the barrier film and in which the transparent conductive film is prevented from developing hair cracks by forming, between the base glass plate and the barrier film, an undercoat for imparting roughness which has a thickness of 150 Å or larger and is made of a crystalline metal oxide. This glass substrate having a transparent conductive film is especially useful as a substrate for an amorphous silicon solar cell.

DESCRIPTION OF THE RELATED ART

Amorphous silicon (hereinafter abbreviated as "a-Si") solar cells are recently used in increasingly broadening applications, ranging from civilian goods such as electronic calculators and watches to electric power supply. In general, a-Si solar cells have a multilayer constitution comprising base glass plate/transparent conductive film/a-Si film/metal electrode film. Sunlight incident on such a solar cell passes from the base glass plate side through the transparent conductive film and then enters the a-Si film. The base glass plate and the transparent conductive film are hence required to have a high transmittance.

Such solar cells, when used for electric power supply, are mounted on the roofs or walls of houses, buildings, etc. and need to have a large area (e.g., 900 mm×600 mm). Consequently, these solar cells frequently employ an inexpensive soda-lime glass (alkali-containing glass) produced by the float process as the base glass plate. In this case, a continuous alkali barrier film is formed on the surface of the base glass plate for the purpose of preventing the alkali components present inside the glass from dissolving away and coming into the coating films to denature or damage the same. A thin film of $SiO_2$ (silicon oxide) is generally used as the continuous alkali barrier film.

Consequently, this kind of glass substrate has a constitution with two films, i.e., base glass plate/$SiO_2$, film/transparent conductive film. The transparent conductive film used is a metal oxide such as ITO (indium-tin oxide), $SnO_2$ (tin oxide) or ZnO (zinc oxide). Those metal oxide films are deposited by a method such as CVD (chemical vapor deposition), sputtering or vacuum vapor deposition. For use in electric power supply,- $SnO_2$ films deposited by CVD are frequently employed because these films are inexpensive and highly suitable for mass production and have a higher adhesion strength than $SnO_2$ films deposited by sputtering or vacuum vapor deposition.

In a-Si solar cells for electric power supply, it is important for the transparent conductive film to have reduced electrical resistance because these cells have a large panel structure. In particular, the transparent conductive film made of $SnO_2$, which is inexpensive, is made to have reduced electrical resistance as a whole by doping the $SnO_2$ with an appropriate impurity and increasing the thickness thereof, because $SnO_2$ has a higher resistivity than ITO. Specifically, the thickness of the transparent conductive $SnO_2$ film should be 5,000 Å or larger.

In forming an $SnO_2$ film on a glass substrate by CVD, the substrate temperature is maintained at around 650° C. during the film deposition. Also in the case of film deposition by sputtering or vacuum vapor deposition, the substrate is frequently heated in order to increase the adhesion strength of the film. Glass substrates constituted of a soda-lime glass plate and a two-layer coating formed by successively depositing a continuous alkali barrier film of $SiO_2$ and a transparent conductive film of $SnO_2$ in this order were subjected to an accelerated test in a high-temperature and high-humidity atmosphere (e.g., 80°C., 100% RH). As a result, it was observed that the transparent conductive films having a thickness of 5, 000 Å or larger developed hair cracks over the entire surface.

A close examination with Scanning Electron Microscope (SEM) revealed that these hair cracks had a width of tens of micrometers (typically, about 20 μm), and that in these hair crack areas, the $SnO_2$ film had completely peeled off to expose the $SiO_2$ film.

SUMMARY OF THE INVENTION

An object of the invention is to provide a glass substrate which has a transparent conductive film comprising $SnO_2$ and in which the transparent conductive film is prevented from developing hair cracks even when it has a thickness as large as 5,000 Å or above.

The present invention provides a glass substrate having a transparent conductive film, that is used to laminate a film for a functional element thereon to form a laminate structure. This glass substrate having a transparent conductive film comprises, as shown in FIG. 1, an alkali-containing base glass plate 10 having a smooth surface and, formed thereon in this order, an undercoat 12 for imparting roughness which has a thickness of 150 Å or larger and is made of a crystalline metal oxide, a continuous alkali barrier film 14 made of $SiO_2$ and having such a small thickness as to reflect the surface roughness of the undercoat, and a transparent conductive film 16 made of $SnO_2$ doped with one or more appropriate impurities and having a thickness of 5,000 Å or larger. The transparent conductive film has an adhesion strength of 37 mN or higher as measured in accordance with "Adhesion Test for Thin Film Deposited on Glass Substrate" as provided for in JIS R3255-1997.

DESCRIPTION OF REFERENCE NUMERALS

Figure 1A:
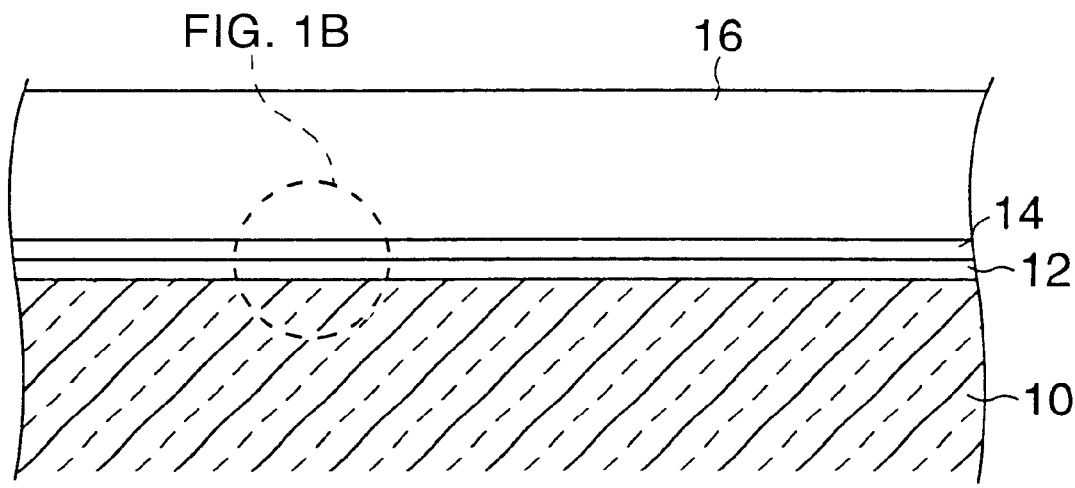
FIGS. 1A and 1B are views illustrating the coating structure of a glass substrate having a transparent conductive film according to the invention.
Figure 1B:
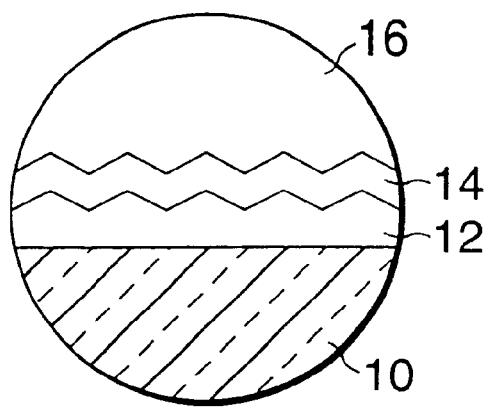

10: Base glass plate
12: Undercoat
14: Continuous alkali barrier film
16: Transparent conductive film

DETAILED DESCRIPTION OF THE INVENTION

The undercoat of a crystalline metal oxide preferably comprises one member selected from $SnO_2$, $In_2O$ (indium oxide) $TiO_2$ (titanium oxide), and ZnO, and has a thickness of preferably from 150 to 2,000 Å, more preferably from 150 to 500 Å. This undercoat is preferably deposited by CVD. The continuous alkali barrier film should be deposited in such a state that the thickness thereof is as small as possible so as to reflect the surface roughness of the undercoat and that the barrier film is continuous and sufficiently thick so as to prevent alkali dissolution. Specifically, the thickness of the alkali barrier film is preferably from 250 to 350 Å. The transparent conductive film is a film of $SnO_2$ doped with fluorine or antimony. The thickness of the transparent conductive film is preferably from 5,000 to 10,000 Å, more preferably from 6,000 to 8,000 Å, so as to reduce the electrical resistance of the glass substrate as a whole and not to impair production efficiency.

$SiO_2$, which constitutes the continuous alkali barrier film, essentially is difficult to deposit as a thick film. When deposited more thinly, the $SiO_2$ constituting the thin film is amorphous. Consequently, the continuous alkali barrier film usually has a surface texture which reflects the surface state of the substrate. $SnO_2$, which constitutes the overlying transparent conductive film, is crystalline. During $SnO_2$ film deposition, each crystal grain grows into an umbrella-like shape (in such a manner that outer-side parts of the crystal grain extend laterally) Especially when an $SnO_2$ film having a thickness of 5,000 Å or larger is deposited, such a manner of crystal growth is conspicuous and, as a result, adjacent crystal grains come to press each other on the outer side. When the glass substrate which has been heated during the film deposition cools to room temperature, the thermal shrinkage of the glass acts to cause an internal compressive stress in in-plane directions.

In the conventional constitution in which a continuous alkali barrier film of $SiO_2$ is formed on a base glass plate having a smooth surface, the surface of the alkali barrier film is relatively flat. Because of this, in depositing a transparent conductive $SnO_2$ film thereon, all the crystal grains uniformly grow in the direction perpendicular to the glass plane and finally become an umbrella-like shape. Consequently, adjacent crystal grains on the outer side strongly press each other to leave a high internal compressive stress in in-plane directions. It is thought that the high internal compressive stress directly acts on the interface between the transparent conductive film and the continuous alkali barrier film to cause hair cracks (microscopic peeling) because the stress is higher than the adhesion strength of the transparent conductive film.

In contrast, in the invention, a continuous alkali barrier film of $SiO_2$ is formed on the roughened undercoat surface Consequently, the continuous alkali barrier film has almost the same surface roughness as the undercoat. As a result, in depositing a transparent conductive $SnO_2$ film thereon, crystal grains grow in random directions (directions perpendicular to the surfaces of the recesses and protrusions of the undercoat), so that the $SnO_2$ is amorphous in the initial stage of deposition. Thereafter, the crystal grains grow in the direction perpendicular to the glass plane and finally become an umbrella-like shape. As a result, adjacent crystal grains on the outer side press each other to leave an internal compressive stress in in-plane directions, and this stress functions as a force which acts so as to peel the conductive film. However, the amorphous layer formed in the initial stage of deposition functions as a buffer to considerably mitigate that force of the in-plane internal compressive stress which directly acts on the interface between the transparent conductive film and the continuous alkali barrier film. Moreover, the transparent conductive film has an enhanced adhesion strength because the interface between the transparent conductive film and the continuous alkali barrier film is rough. These produce a synergistic effect to prevent hair cracking (microscopic peeling).

It is possible to use sandblasting, chemical etching, or the like to mechanically roughen a surface of a smooth base glass plate. However, in view of the large area of the base glass plate, these methods are unsuitable for mass production and are hence undesirable.

Each film in the invention may be formed in any desired method. Examples of usable film formation methods include vacuum deposition, sputtering, a sol-gel method, precipitation from a liquid phase, printing, spraying, and CVD. However, pyrolytic spraying and CVD are effective, which each is a method in which a film-forming material is fed to a surface of a high-temperature glass to deposit a film while utilizing the heat of the glass.

The base glass plate is not particularly limited, and may be an alkali-containing glass because a continuous alkali barrier film is formed. Especially preferred is a glass produced by the highly efficient float process, such as soda-lime glass.

Although a base glass plate formed beforehand may be heated to a high temperature, a more preferred method is to conduct film deposition by feeding a film-forming material into the float bath during float glass production or onto the high-temperature surface of the glass which has just come out of the float bath. This is because in this method, in which film deposition is conducted in a float glass production line, there is no need of further installing a heating apparatus and film deposition in a large area is possible.

A combination of the pyrolytic method with one or more other film deposition processes may be used. For example, a technique may be made in which a tin oxide film is formed by the pyrolytic method and a silicon oxide film is formed by sputtering or a sol-gel method.

Examples of feed materials usable in the case of forming a tin oxide film by the pyrolytic method include inorganic compounds such as tin tetrachloride and organotin compounds such as monomethyltin trichloride, monobutyltin trichloride, dimethyltin dichloride, dibutyltin dichloride, tetramethyltin, tetrabutyltin, dibutyltin diacetate, and dioctyltin diacetate. Examples of oxidizing agents for obtaining tin oxide include dry air, oxygen, water vapor, and ozone.

Examples of feed materials for forming an indium oxide film include indium trichloride. Examples of feed materials for forming a zinc oxide film include dimethylzinc. Examples of feed materials for forming a titanium oxide film include titanium tetrachloride and titanium isopropoxide.

In the case of forming a silicon oxide film by the pyrolytic method, examples of feed materials as silicon sources include inorganic compounds such as silane gases, e.g., monosilane gas and disilane gas, dichlorosilane, and silicon tetrachloride and organic compounds such as tetraethoxysilane, tetramethoxysilane and dibutoxydiacetoxysilane. Examples of oxygen sources include oxygen, ozone, acetone and carbon dioxide. In the case of using a silane gas in forming a silicon oxide film, stable film deposition is possible when ethylene, acetylene, toluene, ethane or the like is added to the gas.

The transparent conductive film contains one or more dopants so as to heighten the electrical conductivity of the tin oxide. Examples of the dopants include fluorine and antimony; fluorine is incorporated by adding, e.g., hydrogen fluoride, trifluoroacetic acid, bromotrifluoromethane or chlorodifluoromethane, while antimony is incorporated by adding, e.g., antimony pentachloride or antimony trichloride.

DESCRIPTION OF THE PREFERRED EMBODIMENTS

As stated hereinabove, the glass substrate having a transparent conductive film according to the invention is intended to be used as a substrate on which a film for a functional element is laminated to form a laminate structure. Typical examples of the functional element include a-Si solar cells. In this application, an a-Si film for a solar cell is superposed on the glass substrate having a transparent conductive film to form a laminate structure. Although this glass substrate is suitable for electric power supply because it can be obtained so as to have a large area, it is a matter of course that the glass substrate is useful also as a small glass substrate for popular goods such as watches and electronic calculators. Besides being used in such applications, the glass substrate having a transparent conductive film according to the invention is applicable to various sensors. Furthermore, the glass substrate having a transparent conductive film can be used alone as an electromagnetic-shielding glass without necessitating any other component.

Figure 2:
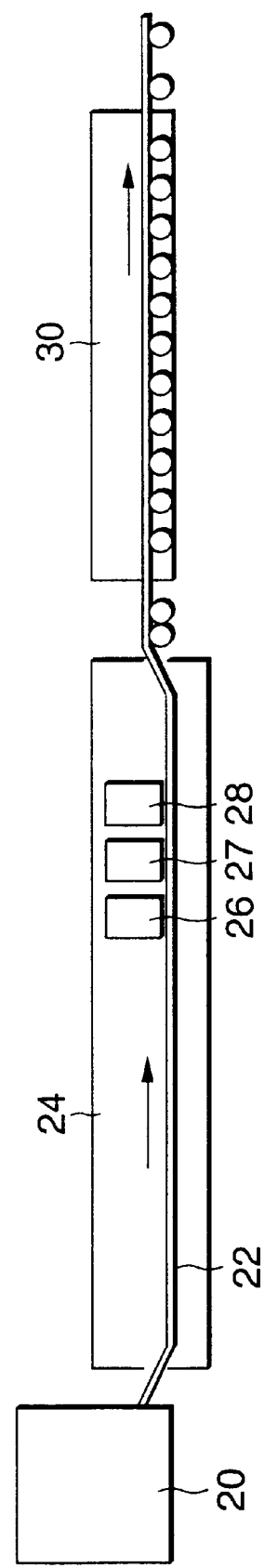
FIG. 2 is a view illustrating one example of an apparatus for producing the glass substrate having a transparent conductive film according to the invention.

FIG. 2 shows one example of an apparatus in which film deposition is conducted in a glass production line; this film deposition technique is suitable for the production of the glass substrate having a transparent conductive film according to the invention. A glass 22 fed from a melting furnace 20 is introduced into a float bath 24 for float glass production. The float bath 24 has two or more (three in this case) pyrolytic CVD devices 26 to 28 integrated thereinto. The glass on which films have been deposited in the float bath 24 is introduced into a lehr 30.

After the glass 22 has been formed so as to have a given thickness in the float bath 24 and while the glass temperature is in the range of from 600 to 750° C., film deposition is done by pyrolytic CVD. An undercoat of tin oxide for imparting roughness is formed with the film deposition device 26 by feeding dimethyltin dichloride diluted with nitrogen together with oxygen and water to the surface of the glass 22. A continuous alkali barrier film of silicon oxide is formed with the film deposition device 27 by feeding monosilane diluted with nitrogen together with ethylene and oxygen to the surface of the glass 22. A transparent conductive film comprising fluorine-doped tin oxide is formed with the film deposition device 28 by feeding a dimethyltin dichloride/hydrogen fluoride mixed gas diluted with nitrogen together with oxygen and water to the surface of the glass 22. In this manner, the three films are successively deposited in the above order. For depositing a thick film such as the transparent conductive film, two or more film deposition devices which are the same as that indicated by numeral 28 may be installed and operated.

After the film deposition, the glass is annealed in the lehr 30 and then subjected to cleaning and cutting steps. Thus, glass substrates of a given size are obtained.

EXAMPLES

Using the apparatus shown in FIG. 2, in which film deposition is conducted in a glass production line, several samples differing in film thickness were produced by the method described above. For the purpose of comparison, samples having no undercoat (conventional structure) were also produced. In producing these samples having no undercoat, the film deposition device 26, for example, was stopped and only the film deposition devices necessary for film formation were operated. Film thickness was regulated by changing the concentration of each feed material.

With respect to each sample, the relationship between the thickness of the layers and properties of the transparent conductive film (the adhesion strength of the transparent conductive film and results of an accelerated test) is shown in Table 1. The values of adhesion strength were found values determined in accordance with Adhesion Test for Thin Film Deposited on Glass Substrate as provided for in JIS R3255-1997. For measuring the adhesion strength, a scratch tester (CSR-02) manufactured by Reska was used which was equipped with a diamond tip having a diameter of 5 $\mu$m. The load imposed on the tip at the time when the film surface came to suffer any change (a change presumed to be initiation of peeling) was taken as the adhesion strength; such a change was detected from photographs taken with an optical microscope. The accelerated test was conducted in a high temperature and high humidity atmosphere, i.e., at 80° C. and 100% RH.

TABLE 1

| Sample No. | Conventional structure | | Comparative example | Sample according to the invention | | |
|---|---|---|---|---|---|---|
| | 1 | 2 | 3 | 4 | 5 | 6 |
| Undercoat $SnO_2$ (Å) | 0 | 0 | 100 | 150 | 250 | 400 |
| Continuous alkali barrier film $SiO_2$ (Å) | 250 | 250 | 250 | 250 | 250 | 250 |
| Transparent conductive film $SnO_2$ + F (Å) | 6500 | 7200 | 6500 | 6500 | 6500 | 6500 |
| Adhesion strength of transparent conductive film (mN) | 33.5 | 29.3 | 34.5 | 37.0 | 38.4 | 45.1 |
| Result of accelerated test (80° C., 100% RH) | xx | xx | x | ○ | ○ | ○ | xx: cracking occurred over the whole surface
x: cracking occurred partly
○: no cracking Table 1 shows the following. The samples having a conventional two-layer coating containing a thick transparent conductive film (Samples 1 and 2) developed hair cracks over the whole glass substrate surface through the accelerated test. The transparent conductive films of these samples had adhesion strengths of 33.5 mN and 29.3 mN, respectively, showing that the thicker the transparent conductive film, the lower the adhesion strength. These results are in agreement with the fact that the conventional technique is free from hair cracking when the transparent conductive film is thin. This is because thin transparent conductive films have a high adhesion strength.

In contrast, in the samples having a three-layer coating containing an $SnO_2$ undercoat (Samples 3 to 6), the glass substrates were reduced in hair cracking in the accelerated test. In particular, the samples in which the undercoat had a thickness of 150 $\mu$m or larger (Samples 4 to 6 according to the invention) underwent no hair cracking. The adhesion strength of the transparent conductive film was 37 mN when the undercoat thickness was 150 $\mu$m. In these samples, the adhesion strength of the transparent conductive film increased with increasing undercoat thickness.

$SnO_2$, used as a material of the undercoat, is a crystalline metal oxide. When deposited in some degree of thickness, $SnO_2$ shows crystallinity and gives a film having a considerably roughened surface. On the other hand, the continuous alkali barrier film has almost the same surface roughness as the undercoat, because the $SiO_2$ constituting the barrier film is amorphous and the barrier film is thin. Consequently, in depositing a transparent conductive $SnO_2$ film thereon, crystal grains grow in random directions (directions perpendicular to the surfaces of the recesses and protrusions of the undercoat), so that the $SnO_2$ is amorphous in the initial stage of deposition. Thereafter, the crystal grains grow in the direction perpendicular to the glass plane and finally become an umbrella-like shape. As a result, adjacent crystal grains on the outer side press each other to leave an internal compressive stress in in-plane directions, and this stress functions as a force which acts so as to peel the conductive film. The larger the film thickness, the higher the action. However, the amorphous layer formed in the initial stage of deposition functions as a buffer to considerably mitigate that force of the in-plane internal compressive stress which directly acts on the interface between the transparent conductive film and the continuous alkali barrier film. Moreover, the transparent conductive film has an enhanced adhesion strength because the interface between the transparent conductive film and the continuous alkali barrier film is rough. These produce a synergistic effect to prevent hair cracking (microscopic peeling).

As described above, in the glass substrate of the invention, an undercoat of a crystalline metal oxide for imparting roughness has been formed between the base glass plate and the continuous alkali barrier film. Due to this constitution, the transparent conductive $SnO_2$ film is prevented from developing hair cracks or peeling off even when it has a thickness of 5,000 Å or larger. Therefore, a high-quality, highly reliable glass substrate having a transparent conductive film is obtained.

What is claimed is:

1. A glass substrate having a transparent conductive film, which is used to laminate a film for a functional element thereon to form a laminate structure, said glass substrate comprising an alkali-containing base glass plate having a smooth surface and, formed thereon in this order, an undercoat for imparting roughness which has a thickness of 150 Å or larger and is made of a crystalline metal oxide, a continuous alkali barrier film made of $SiO_2$ and having such a small thickness as to reflect the surface roughness of the undercoat, and a transparent conductive film made of $SnO_2$ doped with one or more impurities and having a thickness of 5,000 Å or larger, said transparent conductive film having an adhesion strength of 37 mN or higher as measured in accordance with "Adhesion Test for Thin Film Deposited on Glass Substrate" as provided for in JIS R3255-1997.

2. The glass substrate having a transparent conductive film as claimed in claim 1, wherein said film for a functional element is an amorphous silicon film for a solar cell.

3. The glass substrate having a transparent conductive film as claimed in claim 1 or 2, wherein the metal oxide undercoat is a CVD film made of one member selected from the group consisting of $SnO_2$, $In_2O$, $TiO_2$, and ZnO and has a thickness of from 150 to 500 Å.

4. The glass substrate having a transparent conductive film as claimed in claim 1, wherein the continuous alkali barrier film has a thickness of from 250 to 350 Å and the transparent conductive film has a thickness of from 5,000 to 10,000 Å.

* * * * *